United States Patent
Slabinski et al.

(10) Patent No.: US 6,301,240 B1
(45) Date of Patent: *Oct. 9, 2001

(54) CENTRALLY LOCATED EQUIPMENT FOR WIRELESS TELEPHONE SYSTEM

(75) Inventors: Richard P. Slabinski, Temple; Michael T. Dawson, Manchester, both of NH (US)

(73) Assignee: Transcept, Inc., Manchester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,274

(22) Filed: Feb. 19, 1998

(51) Int. Cl.[7] .................................................. H04J 1/10
(52) U.S. Cl. ........................................... 370/343; 370/480
(58) Field of Search .................................. 370/480, 486, 370/487, 401, 481, 485, 338, 343, 489, 490; 455/426, 557

(56) References Cited

U.S. PATENT DOCUMENTS

| | | |
|---|---|---|
| 4,144,411 | 3/1979 | Frenkiel . |
| 4,392,245 | 7/1983 | Mitama . |
| 4,882,765 | 11/1989 | Maxwell et al. . |
| 4,914,715 | 4/1990 | Miyata . |
| 5,067,173 | 11/1991 | Gordon et al. . |
| 5,129,098 | 7/1992 | McGirr et al. . |
| 5,193,223 | 3/1993 | Walczak et al. . |
| 5,303,287 | 4/1994 | Laborde . |
| 5,321,736 | 6/1994 | Beasley . |
| 5,327,144 | 7/1994 | Stilp et al. . |
| 5,343,493 | 8/1994 | Karimullah . |
| 5,381,459 | * 1/1995 | Lappington ............................ 370/432 |
| 5,396,484 | 3/1995 | Itoh . |
| 5,416,802 | 5/1995 | Ishii . |
| 5,452,473 | 9/1995 | Weiland et al. . |
| 5,513,176 | 4/1996 | Dean et al. . |
| 5,574,966 | * 11/1996 | Barzegar et al. ...................... 455/6.1 |
| 5,590,173 | 12/1996 | Beasley . |
| 5,768,279 | 6/1998 | Barn et al. . |
| 5,781,541 | 7/1998 | Schneider . |
| 5,781,859 | 7/1998 | Beasley . |
| 5,802,173 | 9/1998 | Hamilton-Piercy et al. . |
| 5,805,983 | * 9/1998 | Naidu et al. ......................... 455/67.6 |
| 5,809,395 | 9/1998 | Hamilton-Piercy et al. . |
| 5,822,324 | * 10/1998 | Kostresti et al. ...................... 370/487 |

FOREIGN PATENT DOCUMENTS

| | | |
|---|---|---|
| 2253770 A | 9/1992 | (GB) . |
| 2289198 A | 11/1995 | (GB) . |

* cited by examiner

Primary Examiner—Min Jung
(74) Attorney, Agent, or Firm—Kirkpatrick & Lockhart LLP (57) ABSTRACT

Simplified centrally located equipment for use in a wireless telephone system that uses of an existing broadband distribution network to carry telephony signals between an existing telephone network and remote transceivers sites in defined cells or sectors is disclosed. The simplification is accomplished by reducing the number of frequency translation steps between elements of the centrally located equipment by using the same carrier frequency for signal handling within the elements of the centrally located equipment as is used to transmit telephony signals between elements.

15 Claims, 5 Drawing Sheets

CENTRALLY LOCATED EQUIPMENT FOR WIRELESS TELEPHONE SYSTEM

FIELD OF THE INVENTION

The present invention relates to wireless communications systems, and more particularly to improved centrally located equipment for a wireless telephone system that incorporates an existing broadband distribution network, such as cable television network cable, to carry communication signals between wireless telephones and the centrally located equipment.

BACKGROUND OF THE INVENTION

The prior art teaches the use of an existing broadband distribution network to carry telephony signals between an existing telephone network and remote transceivers sites in defined cells or sectors. The remote transceivers, sometimes called Remote Antenna Drivers (RADs), are used to establish wireless telephony communication links with wireless telephones operating with an area covered by each RAD. Such broadband distribution networks include, but are not limited to, fiber-optic cable, coaxial cable, and radio links.

Between the telephone network and the broadband distribution network is centrally located equipment for carrying the telephony signals between the telephone network and the broadband network. This centrally located equipment typically includes multiple Base Transceiver Stations (BTS) and multiple Remote Antenna Signal Processors (RASPs). Each BTS is connected to the telephone network and to the RASPs. Each RASP is connected to the broadband network.

In typical operation, an audio telephony signal from the existing telephone network, and directed to a wireless telephone, is input to a BTS where it is encoded for use in one of the known wireless telephone systems, which include GSM, CDMA and CT2. The encoded telephony signal is used to modulate a radio frequency carrier signal of an intermediate frequency (IF) before being processed further. Before being transmitted to a RASP the IF signal is frequency translated to a higher radio frequency (RF) carrier signal for transmission to a RASP. When the encoded telephony signal, now being carried by the RF carrier signal, is received by the RASP, it is frequency translated back to an IF carrier signal and control signals are added. After this processing the encoded signal and control signals are frequency translated to another RF carrier frequency used for transmission over the broadband distribution network to the Remote Antenna Drivers (RADs) in the cells or sectors. Such transmission over the broadband network is typically over fiber-optic cable or over coaxial cable.

Similarly, encoded telephony and control signals received by the RASPs over the broadband distribution network from the Remote Antenna Drivers (RADs) are first converted to an IF carrier signal. The IF carrier signal is initially signal processed in the RASP to remove the control signals, and the IF carrier signal is then translated to an RF signal for transmission to a BTS. In each BTS the RF carrier signal carrying the telephony signal is first converted to an IF carrier signal before the telephony signal is extracted and converted into an analog or digital signal, depending on the type of system, and the encoded telephony signal is then sent to the telephone network.

SUMMARY OF THE INVENTION

The prior art systems described above utilize much frequency translation of the carrier signal as it passes through the Remote Antenna Signal Processor (RASP) and Base Transceiver Station (BTS). Thus, there is a need in the wireless telephony art for improved, simplified central equipment, such as the RASPs and BTSs, for processing and carrying telephony signals between an existing telephone network and wireless telephones.

The above described need in the wireless telephony art is satisfied by the present invention. The improvement comprises simplifying the Base Transceiver Stations (BTS) and the Remote Antenna Signal Processors (RASPs). This simplification lowers the cost of the BTS and RASP equipment, and decreases their complexity, which improves their reliability.

This simplification consists of reducing the number of frequency translation steps utilized in the BTS and RASP equipment. More particularly, for telephony signals originating at the telephone network and terminating at a wireless telephone, the IF carrier signal in each BTS is not translated to an RF carrier signal before being transmitted to a RASP. In addition, the IF carrier signal in each RASP is not translated to an RF carrier signal before being transmitted to a BTS. Rather, the frequency of the IF carrier signal in the RASPs and BTSs is the same, and the IF carrier signals are transmitted between the BTSs and the RASPs. This result is a significant savings in the complexity and cost of the RASPs and BTSs.

Since each prior art BTS and RASP has a number of telephony signal channels, each of which has the above described RF/IF translations, there is a large reduction in the number of frequency translation stages in this equipment. All IF to RF, and all RF to IF frequency translation stages at the RASP to BTS interface are eliminated.

DESCRIPTION OF THE DRAWING

The invention will be better understood upon reading the following Detailed Description in conjunction with the drawing in which.

DETAILED DESCRIPTION

Figure 6:
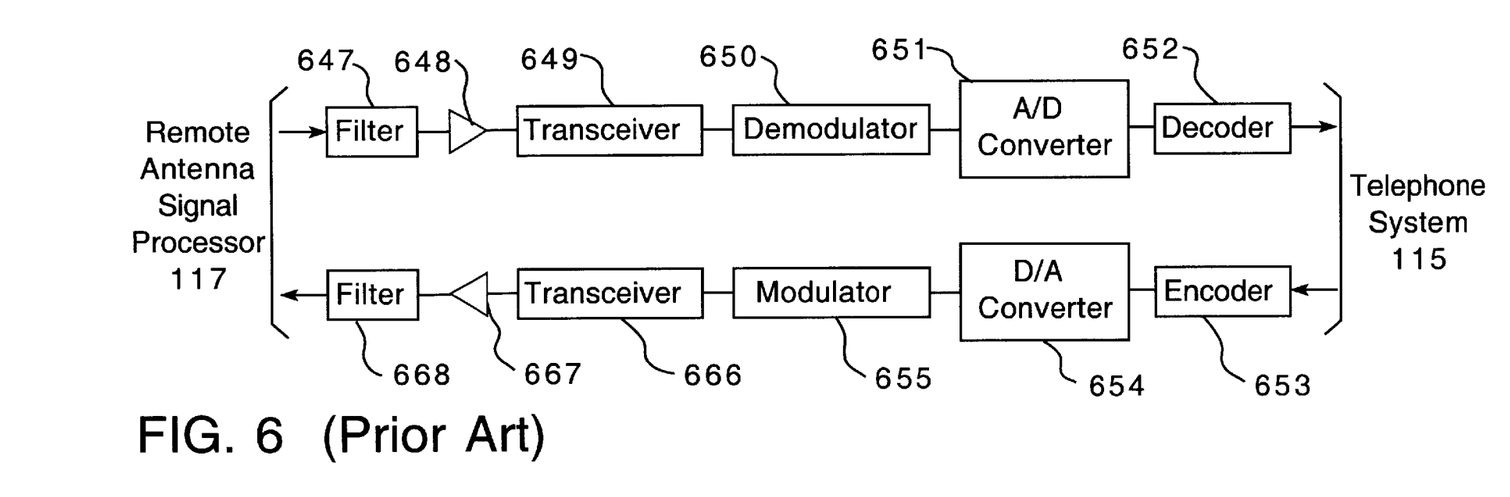
FIG. 6 is a block diagram of a prior art Base Transceiver Station (BTS) used with a wireless telephony system to carry telephony signals between RASPs and BTSs.
Figure 7:
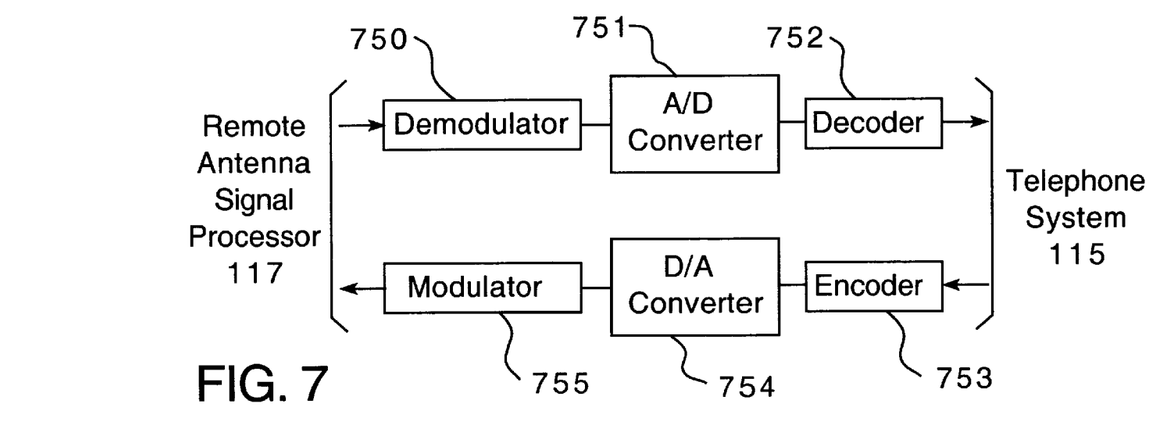
FIG. 7 is a block diagram of a Base Transceiver Station (BTS) incorporating the teaching of the present invention.

In the drawing and following detailed description all circuit elements are assigned three digit reference numbers. The first digit of each reference number indicates in which Figure of the drawing an element is shown. The second and third digits of each reference number indicate specific circuit elements. If the same circuit element appears in more than one Figure of the drawing, the second and third digits of the reference number for that circuit element remain the same and only the first digit of the reference number changes to indicate the Figure of the drawing in which the circuit element is located. Thus, signal detector 225 in FIG. 2 is the same signal detector labeled 425 in FIG. 4. The term "reverse direction" refers to any signals traveling from Broadband Distribution Network 114 toward Telephone System 115, and the term "forward direction" refers to any signals traveling from Telephone System 115 toward Broadband Network 114 and finally a wireless telephone. In the cable television industry the "forward direction" is referred to as "downstream", and the "reverse direction" is referred to as "upstream". This is mentioned because the wireless telephone system described herein can be utilized with a cable television distribution network. As used herein the term "telephony signals" includes voice, data, facsimile and any other type of signals that are sent over a telephone network now or the future. Drawing FIGS. 2 through 5 show prior art and new versions of Remote Antenna Signal Processor (RASP) 117 shown in FIG. 1; and drawing FIGS. 6 and 7 show prior art and new versions of Base Transceiver Station (BTS) 116 shown in FIG. 1. Throughout this Detailed Description, when FIGS. 2 through 7 are being described, reference is often made to RASP 117 and BTS 116 to remind the reader what circuits these Figures are part of, although the reference numbers 116 or 117 do not actually appear on those Figures.

Figure 2:
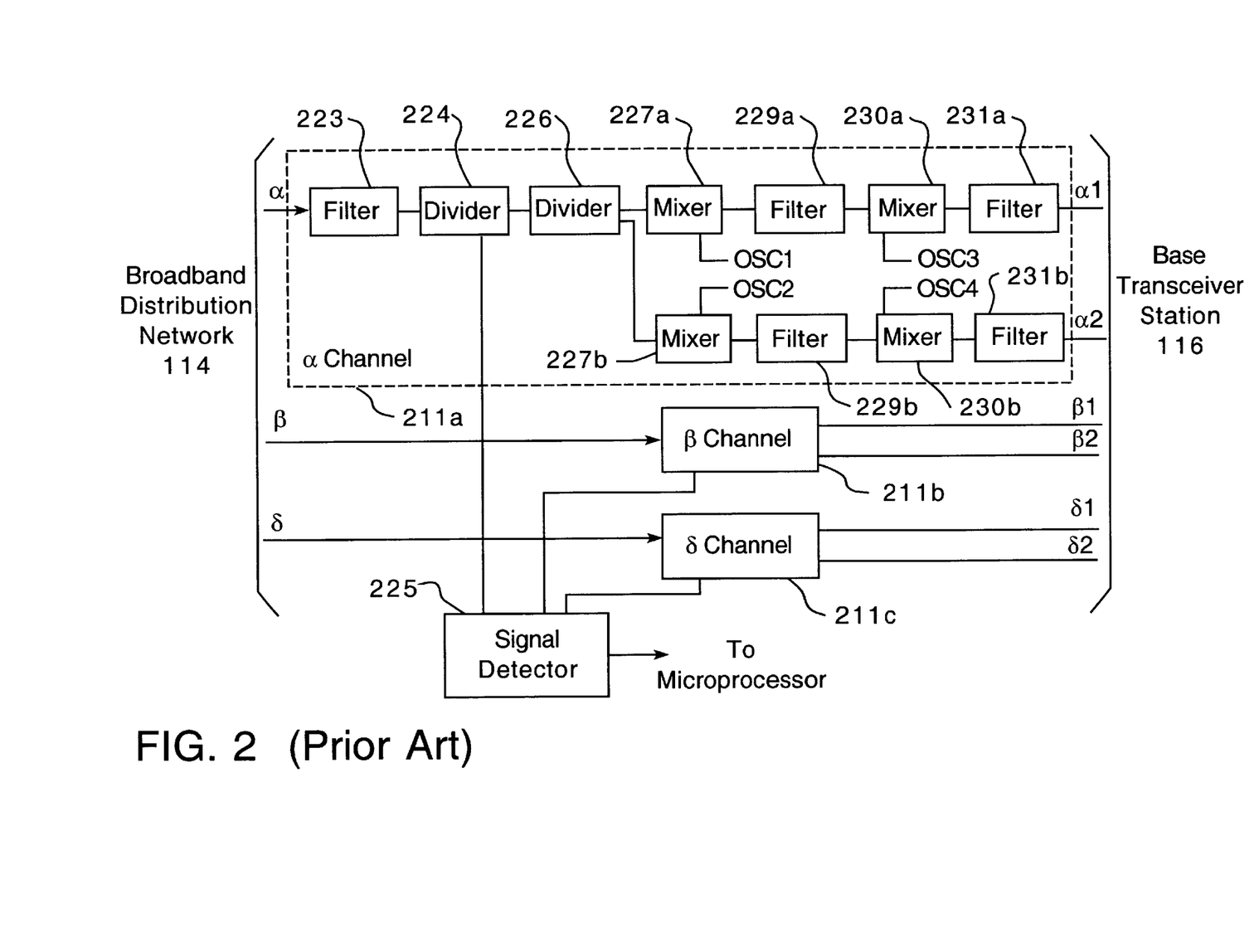
FIG. 2 is a block diagram of the reverse direction portion of a prior art Remote Antenna Signal Processor (RASP) used with a wireless telephony system to transmit telephony signals toward Base Transceiver Stations (BTSs)
Figure 3:
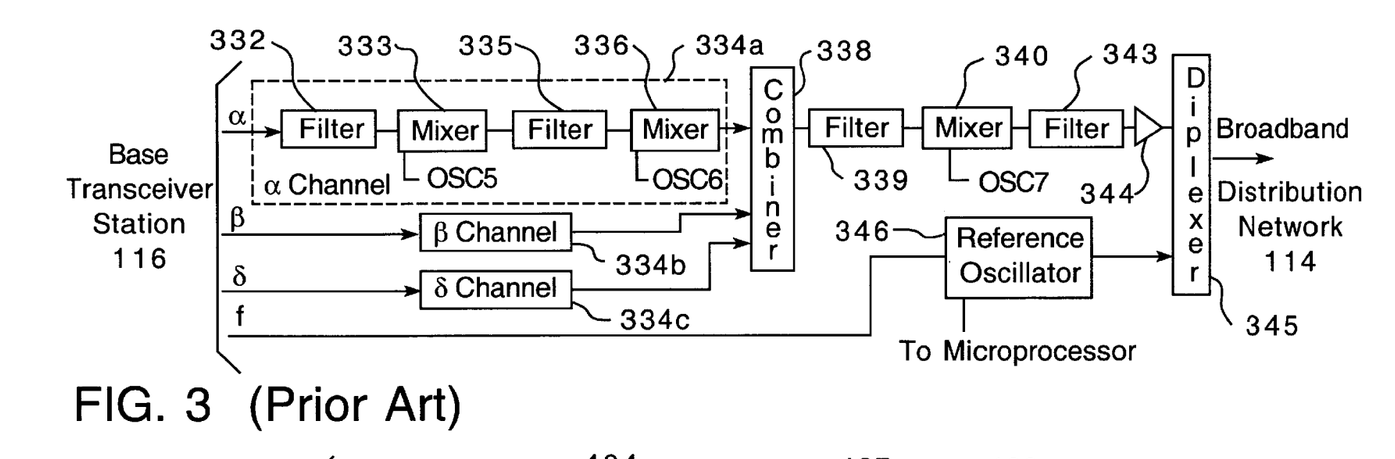
FIG. 3 is a block diagram of the forward direction portion of a prior art Remote Antenna Signal Processor (RASP) used with a wireless telephony system to transmit telephony signals toward Remote Antenna Drivers (RADs)
Figure 4:
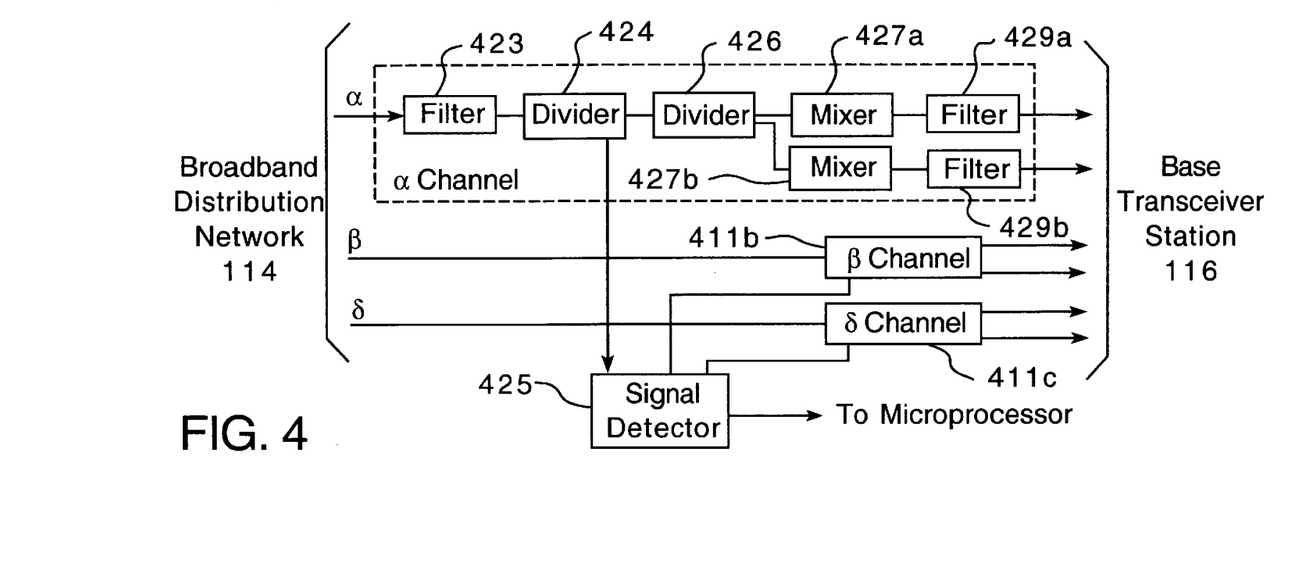
FIG. 4 is a block diagram of the reverse direction portion of a Remote Antenna Signal Processor (RASP) incorporating the teaching of the present invention.
Figure 5:
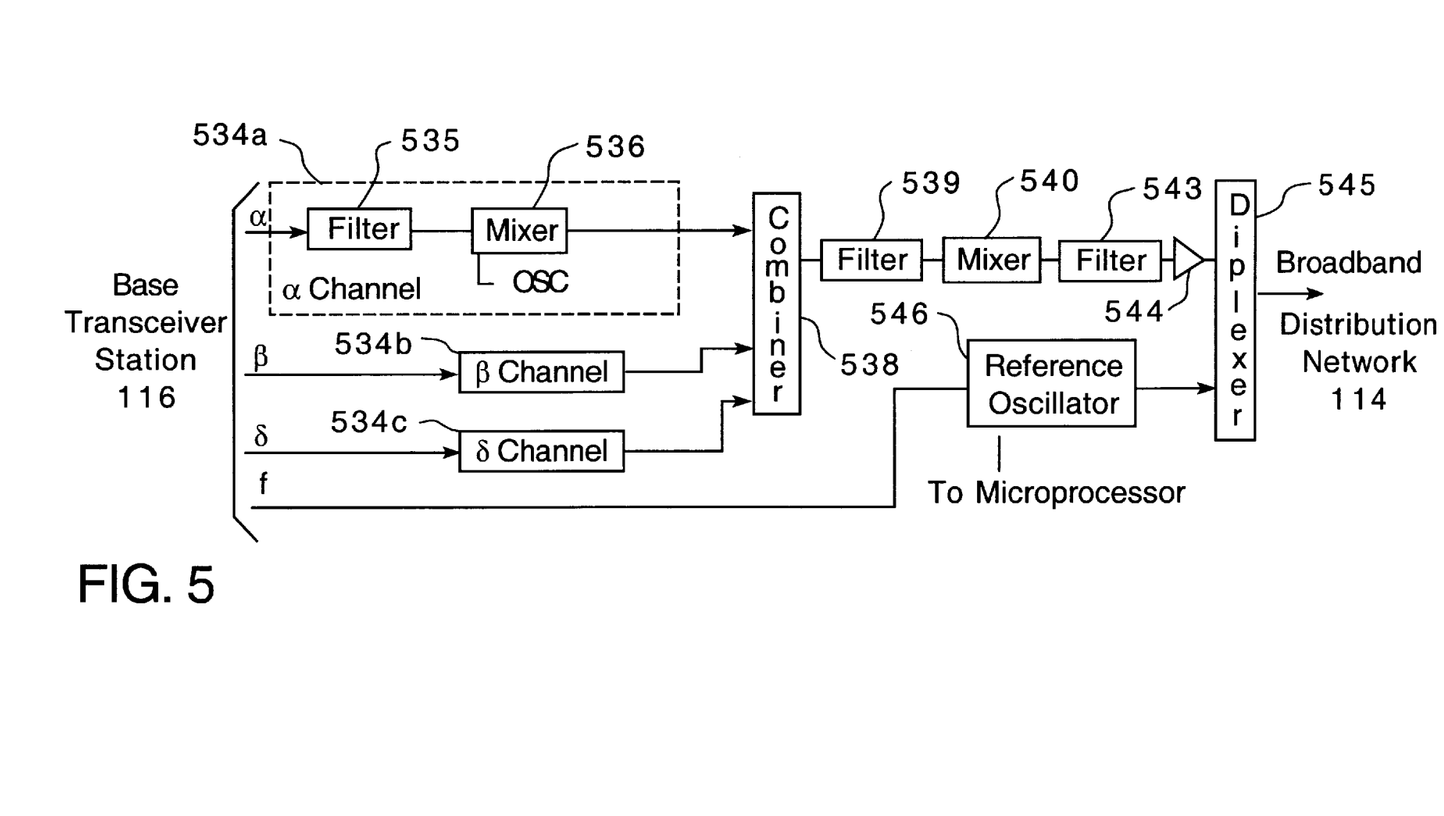
FIG. 5 is a block diagram of the forward direction portion of a Remote Antenna Signal Processor (RASP) incorporating the teaching of the present invention.

As mentioned in the above Description of the Drawing, FIGS. 2 and 3 respectively show the reverse direction and forward direction portions of a prior art Remote Antenna Signal Processor (RASP) 117, and FIGS. 4 and 5 respectively show the reverse direction and forward direction portions of a Remote Antenna Signal Processor (RASP) 117 which utilizes the teaching of the present invention. FIG. 6 shows the reverse direction and forward direction portions of a prior art Base Transceiver Station (BTS) 116, and FIG. 7 shows the reverse direction and forward direction portions of a Base Transceiver Station 116 which utilizes the teaching of the present invention. FIGS. 2 through 7 function in the following manner.

In the reverse direction portion of the prior art wireless telephone system described herein, telephony and control signals received from a wireless telephone 119 and a Remote Antenna Driver 118 via Broadband Distribution Network 114 are input to the prior art reverse direction RASP 117 circuitry shown in FIG. 2. After signal processing to separate telephony signals from control signals, the telephony signals are transmitted from prior art RASP 117 in FIG. 2 to the prior art reverse direction BTS 116 circuitry shown in the upper part of FIG. 6. After signal processing in BTS 116 to decode the telephony signals, the analog or digital telephony signals are sent to Telephone System 115.

In the forward direction portion of the prior art wireless telephone system described herein, telephony signals are sent from Telephone System 115 to BTS 116 in FIG. 6 to encode the telephony signals before they are transmitted from prior art BTS 116 in FIG. 6 to the prior art forward direction circuitry of RASP 117 shown in FIG. 3. After adding control signals the combined telephony and control signals are transmitted from the prior art RASP in FIG. 3, via Broadband Distribution Network 114 to a Remote Antenna Driver 118, and finally to a wireless telephone 119.

Similarly, in the reverse direction portion of a wireless telephone system as described herein, which utilizes the teaching of the present invention, telephony and control signals received from a wireless telephone 119 and a Remote Antenna Driver 118 via Broadband Distribution Network 114, are input to the reverse direction RASP 117 circuitry shown in FIG. 4. After separating the control signals the telephony signals are transmitted from RASP 117 in FIG. 4 to reverse direction BTS 116 circuitry shown in the upper part of FIG. 7. After signal decoding in BTS 116, the telephony signals are sent to Telephone System 115.

In the forward direction portion of the wireless telephone system as described herein, which utilizes the teaching of the present invention, telephony signals are sent from Telephone System 115 to the forward direction BTS circuitry in the lower portion of FIG. 7 for initial signal encoding before they are transmitted from BTS 116 to the prior art forward direction circuitry of RASP 117 shown in FIG. 5. After adding control signals, to transmit telephony signals toward telephony and control signals are transmitted from RASP 117 in FIG. 5 to a Remote Antenna Driver 118 and wireless telephone 119 via Broadband Distribution Network 114.

Figure 1:
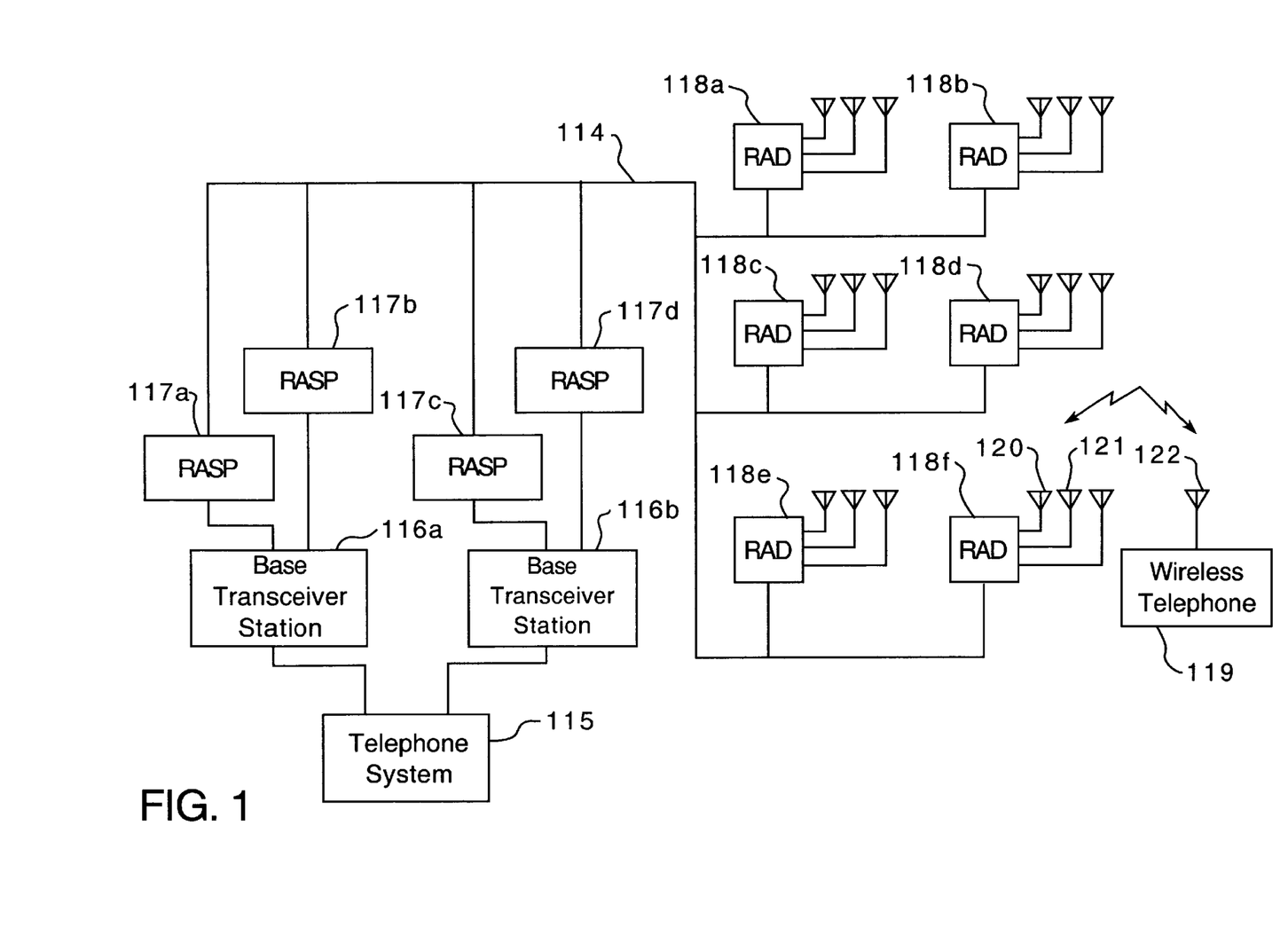
FIG. 1 is a block diagram of a typical wireless telephony system integrated with an exemplary broadband distribution network.

In FIG. 1 is shown a simplified block diagram of an exemplary broadband distribution network 114 integrated with elements of a wireless telephone system. The wireless telephone system includes a plurality of remote transceivers known as Remote Antenna Drivers (RADs) 18a–f. There are different types of broadband distribution networks 114 in use, and such networks may utilize coaxial cable, fiber optic cable, microwave links, or combinations of these. The broadband distribution network 114 disclosed herein is a conventional hybrid fiber coaxial (HFC) cable to which a plurality of RADs 118a–f are connected. Electrical power is distributed along broadband distribution network 114 to power line amplifiers (not shown) of the broadband distribution network in a manner well known in the art. This electrical power source, or alternate power sources, are also used to provide power to RADs 118a–f.

Integrated with broadband distribution network 114 is a wireless telephony system in which the present invention is utilized. One such wireless telephony system is taught in U.S. patent application Ser. No. 08/695,175, filed Aug. 1, 1996, and entitled "Apparatus And Method For Distributing Wireless Communications Signals To Remote Cellular Antennas". Another such wireless telephony system is taught in U.S. Pat. No. 5,381,459. The telephony system disclosed herein includes Base Transceiver Stations (BTS) 116a&b which are connected to a Telephone System 115. Base Transceiver Stations 116a&b are also connected to Remote Antenna Signal Processors (RASPs) 117a–d which are the interface to Broadband Distribution Network 114. Telephony signals and control signals to be sent between Telephone System 115 and Broadband Distribution Network 114 pass through and are processed by RASPs 117a–d and RADs 118a–f.

As is known in the prior art, including the above cited prior patent application and issued patent, one or more frequency bands or channels of the Broadband Distribution Network 114 are reserved to carry telephony signals and control signals between Telephone System 115 and wireless telephones 119. Telephony signals originating from Telephone System 115 pass through BTSs 116a&b and RASPs a–d and are transmitted along with control signals in frequency division multiplexing format, over Broadband Distribution Network 114 to ones of the plurality of RADs 118a–f, which are also connected to Broadband Distribution Network 114, and thence to wireless telephones 119. Telephony signals originating at wireless telephones 119 are frequency multiplexed together by RADs 118a–f and transmitted along with control signals via Broadband Distribution Network 114 to an ones of RASPs 117a–d, thence to Base Transceiver Stations 116a&b, and finally to Telephone System 115.

In each of BTSs 116a&b there are a plurality of transceiver modules (not shown), as is known in the wireless telephony art, each of which operates at a single frequency, and which can handle a predetermined maximum number of telephony calls from wireless telephones. In the wireless telephone system described and claimed herein, the frequency at which the RADs 118a–f are assigned to operate must correspond to the operating frequency of an assigned BTS 116a or b transceiver module. If a particular RAD 118 is re-assigned to function with a different transceiver module within BTS 116a or b, circuit settings within the particular RAD 118 must also be changed to function with the different transceiver module. In the wireless telephony art, transceiver modules in a BTS 116 are also referred to as channel card modules and radio modules.

In FIG. 1 are shown three rows of RADs 118. Typically, a number of RADs 118a–f are spaced along, and connected to, Broadband Distribution Network 114 to provide overlapping signal transmission and reception coverage for the entire wireless telephone system. Some of the RADs 118a–f are physically located near the boundary between two or more cells or sectors and, depending on the frequency of operation they are set to, can be used to handle wireless telephony traffic in one or more of the sectors or cells. In FIG. 1, RADs 118e&f in the bottom row are physically located along Broadband Distribution Network 114 and are configured to handle wireless telephony traffic in a first sector. RADs 118c&d in the middle row in FIG. 1 are configured and located to handle wireless telephone traffic in a second, adjacent sector. Finally, RADs 118a&b are configured and located to handle wireless telephone traffic in a third, adjacent sector.

Each of RADs 118a–f has antennas 120, 121, 122 which are used to transmit to, and receive signals from, remote wireless telephones 119. Antenna 120 is used to transmit telephony signals to wireless telephones 119, while antennas 121 and 122 are used to receive telephony signals from wireless telephones 119. Antenna 121 is called the primary antenna, and antenna 122 is called the diversity antenna. Antennas 121 and 122 are physically spaced and cooperate to minimize signal fading and thereby provide continuous signal reception from wireless telephones 119.

In FIG. 2 is shown a block diagram of the reverse direction portion of a prior art Remote Antenna Signal Processor (RASP) 117. The reverse direction circuitry processes telephony and control signals received from wireless telephones and RADs 118, and received via a Broadband Distribution Network 114, and forwards them to prior art Base Transceiver Station 116 shown in FIG. 6.

Within the prior art RASP circuit are three parallel channel circuits 211a, 211b and 211c. These three circuits are referred to as alpha, beta and gamma channels and they operate in the same manner except for their frequency of operation to handle telephony signals in different channels. To simplify the description of the reverse direction RASP circuit shown in FIG. 2, only alpha channel circuit 211a is described in detail. There may be more than three such channel circuits in a RASP 117.

Telephony signals from a wireless telephone 119, and control signals from a RAD 118 that is carrying the telephony signals, are carried over Broadband Distribution Network 114 to bandpass filter 223 at the input of alpha channel 211a. These telephony and control signals are divided for further processing as described further in this detailed description. Filter 223 removes out of band signals that are present on Broadband Distribution Network 114 before the telephony and control signals are input to signal divider 224. Divider 224 divides and applies the combined telephony and control signals to both divider 226 and to signal detector 225.

Signal detector 225 separates the control signals from the telephony signal and forwards them to a microprocessor for processing. The microprocessor analyzes the control signals and causes circuit adjustments to be made in RASPs 117 and RADs 118.

Divider 224 also applies the telephony signal to divider 226 which again divides the signal, which includes the combined signals from primary receive antenna 121 and diversity receive antenna 122, and applies them to mixers 227a and 227b. As briefly described hereinabove, the telephony signal received by the primary receive antenna 121 and diversity receive antenna 122 from a single RAD 118 are frequency multiplexed together. Mixers 227a and 227b are used to separate these two frequency multiplexed telephony signals.

Mixer 227a has a second input from oscillator OSC1, and mixer 227b has a second input from oscillator OSC2. The frequency of oscillators OSC1 and OSC2 is different and the mixing process of mixers 227a and 227b causes the modulated carrier signal output from each of them to have the same intermediate frequency (IF) carrier signal. The frequency of oscillators OSC1 and OSC2 are controlled by the microprocessor and are set according to the assigned frequency of operation for the alpha channel on Broadband Distribution Network 114.

The heterodyning process of mixers 227a and 227b produce a number of unwanted signals which are removed respectively by bandpass filters 229a and 229b, and which respectively pass only the desired telephony signal from the primary antenna and the diversity antenna of a RAD 118.

Only the primary receive antenna telephony signal is output from filter 229a and is input to mixer 230a where it is mixed with a signal from oscillator OSC3. The heterodyning process of mixer 230a is used to translate the intermediate frequency carrier signal, modulated with the primary receive antenna telephony signal, to a radio frequency (RF) carrier signal that is transmitted via path alpha 1 to prior art Base Transceiver Station 116 in FIG. 6. The heterodyning process of mixer 230a also produces a number of unwanted signals that are removed by bandpass filter 231a.

Only the secondary receive antenna telephony signal is output from filter 229b and is input to mixer 230b where it is mixed with a signal from oscillator OSC4. The heterodyning process of mixer 230b is used to translate the IF carrier signal, modulated with the secondary receive antenna telephony signal, to an RF carrier signal that is transmitted via path alpha 2 to prior art Base Transceiver Station 116 in FIG. 6. The heterodyning process of mixer 230b also produces a number of unwanted signals that are removed by bandpass filter 231b.

The alpha, beta and gamma channels 211a, 211b and 211c operate in the same manner except for their frequency of operation. To simplify the description of RASP 117 circuitry only the alpha channel circuitry 211a is described in detail above, and is not repeated for beta channel 211b and gamma channel 211c.

In FIG. 3 is shown a block diagram of the forward direction portion of a prior art Remote Antenna Signal Processor (RASP) 117. The forward direction circuitry processes telephony signals received from a Base Transceiver Station 116 to add control signals, and transmits them via Broadband Distribution Network 114 to and RADs 118 to wireless telephones 119 in FIG. 1. Within the prior art RASP 117 are three parallel forward direction circuits which also are referred to as alpha, beta and gamma channels 334a, 334b and 334c. They all operate in the same manner except for their frequency of operation, so only the operation of the alpha channel 334a is described in detail.

Telephony signals modulating an RF carrier signal are received from prior art BTS 116 (FIG. 6) in the alpha channel are input to bandpass filter 332 to remove all out of band signals. The filtered RF signals are then input to mixer 333 along with a signal from oscillator OSC5 for frequency translation to an IF carrier frequency. The heterodyning process of mixer 333 also produces a number of unwanted signals which are removed by bandpass filter 335. This IF carrier signal is later translated back to an RF carrier signal before being transmitted over Broadband Distribution Network 114 to Remote Antenna Driver 118 for transmission to wireless telephones 119 in a manner known in the prior art.

The filtered IF carrier signal, modulated by the telephony signal, is input to a second mixer 336 along with an input from oscillator OSC6. The frequency of oscillator OSC6, and corresponding oscillators in the beta and gamma channels 334b and 334c are set by a microprocessor. The result is that the IF carrier signal in the alpha, beta and gamma channels is different.

The IF carrier signal output from mixer 336 is input to combiner 338 along with the IF carrier signals from beta channel 334b and gamma channel 334c. Combiner 338 combines the three IF carrier signals, each at a different frequency, into a single frequency multiplexed signal which is input to bandpass filter 339 where all unwanted frequencies from the heterodyning process of mixer 336, and the similar mixers in the beta and gamma channels, are removed. Only the three frequency multiplexed IF carrier signals, modulated respectively by the alpha, beta and gamma channel telephony signals, are passed through filter 339 to mixer 340.

Mixer 340 is used to translate the frequency of the IF carrier signals output from filter 339, now carrying telephony signals from the alpha 334a, beta 334b and gamma 334c channels, to an RF carrier signal for transmission over Broadband Distribution Network 114 to a RAD 118.

The output of mixer 340 includes many unwanted signals which are removed by bandpass filter 343. The desired RF carrier signal is amplified by amplifier 344 before being input to diplexer 345 along with a second input that is now described.

On lead "f" from BTS 116 is a reference signal. This reference signal is used to control reference oscillator 346 to transmit a reference oscillator signal to all RADs 118 to accurately set the frequency of operation of their internal oscillators (not shown).

Diplexer 445 is used to combine the RF carrier signal described above with the reference oscillator 346 signal for transmission over Broadband Distribution Network 114 to RADs 118.

In the preceding description of a prior art Remote Antenna Signal Processor (RASP) 117 it can be appreciated that the carrier signals carrying telephony and control signals are frequency translated up and down, to provide an IF carrier signal inside RASP 117 but an RF carrier signal outside of RASP 117. The same thing is done in prior art Base Transceiver Stations 116 as described further in this detailed description. These multiple steps of frequency translation introduce noise and signal distortions, as well as higher cost, into the cost of a wireless telephone system.

In FIG. 4 is shown a circuit block diagram of the reverse direction portion of a Remote Antenna Signal Processor (RASP) 117 incorporating the teaching of the present invention. When comparing the new reverse direction RASP 117 circuitry shown in FIG. 4 with the prior art reverse direction RASP 117 circuitry shown in FIG. 2, it can be seen that the two circuits are similar but the new reverse direction circuitry shown in FIG. 4 is much simpler. Those portions of the alpha, beta, and gamma channel circuits in FIG. 4 that have corresponding circuits in FIG. 2 operate in the same manner and for the same purposes as the corresponding circuits. Thus, for example, divider 226 in FIG. 2 performs the same function and for the same purpose as divider 426 in FIG. 4. Accordingly, the operation of the corresponding individual circuit elements in alpha channel 411a in FIG. 4 are not described herein, and the reader is referred to the circuit description for FIG. 2.

In alpha channel 411a it can be seen that there are no mixers and filters corresponding to mixers 230a&b and filters 231a&b in FIG. 2. These last mentioned mixers and filters in the prior art reverse direction RASP 117 circuitry are used to translate the frequency of the reverse direction IF carrier signal used in the reverse direction alpha channel 211a circuit to an RF carrier signal for transmitting the telephony signals to Base Transceiver Station 116 in FIG. 6. As mentioned previously, in accordance with the teaching of the present invention, the IF carrier signal is used to carry encoded telephony signals between RASPs 117 and BTSs 116, so circuitry in RASP 117 to translate the intermediate frequency carrier signal to an RF carrier signal is not needed. In reverse direction alpha channel 411a there is a reduction in complexity of four circuits as described immediately above. Between alpha channel 411a, beta channel 411b, and gamma channel 411c a total of twelve circuits are eliminated in just the reverse direction circuits. The cost savings in one RASP 117 is obvious, and the cost savings are increased when it is considered that there are many RASPs 117.

Turning now to FIG. 5, therein is shown a block diagram of the forward direction portion of a Remote Antenna Signal Processor (RASP) 117 incorporating the teaching of the present invention. When comparing the new forward direction RASP 117 circuitry shown in FIG. 5 with the prior art forward direction RASP 117 circuitry shown in FIG. 3 it can be seen that the two circuits are similar but the new forward direction circuitry shown in FIG. 5 is much simpler. Those circuits in the alpha, beta, and gamma channels 534a, 534b and 534c in FIG. 5 that have corresponding circuits in FIG. 3 operate in the same manner and for the same purposes as the corresponding circuits in FIG. 3. Thus, for example, combiner 338 in FIG. 3 performs the same function and for the same purpose as combiner 538 in FIG. 5. Accordingly, the operation of the corresponding individual circuit elements in alpha channel 534a in FIG. 5 are not described herein, and the reader is referred to the circuit description for FIG. 3.

In alpha channel 534a of FIG. 5 it can be seen that there is no filter and mixer corresponding to filter 332 and mixer 333 in FIG. 2. Mixer 333 and filter 332 in the prior art forward direction RASP 117 circuitry are used to translate the forward direction RF carrier signal received from Base Transceiver Station 116 (FIG. 6) to an IF carrier signal. This also applies to forward direction beta channel 534b, and gamma channel 534c.

In new forward direction alpha channel 534a there is a reduction in complexity of two circuits as described in the previous paragraph. Between alpha channel 534a, beta channel 534b, and gamma channel 534c a total of six circuits are eliminated in the forward direction RASP circuits. The cost savings in one RASP 117 is obvious, and the cost savings are increased when it is considered that there are many RASPs 117.

In summary, between the reverse direction and forward direction circuits of new RASP 117 there is a reduction of 18 circuits when compared to prior art RASPs. The savings are obviously significant. In addition to cost savings, a simpler RASP 117 will have fewer maintenance problems which results in additional savings. Further savings are achieved by lower power consumption of each RASP 117.

In FIG. 6 is shown a block diagram of a prior art Base Transceiver Station (BTS) 116 used with a wireless telephony system. Each BTS 116 has three reverse direction circuits designated alpha, beta, and gamma; and three forward direction circuits designated alpha, beta, and gamma. In FIG. 6 only one reverse direction circuit and one forward direction circuit are shown for the purpose of simplicity. The three reverse direction circuits are all identical and the three forward direction circuits are all identical, so there is no need to show and describe the reverse direction and forward direction beta and gamma circuits to understand their operation.

As described above with reference to FIG. 2, Remote Antenna Signal Processor (RASP) 117 uses an RF carrier signal to transmit reverse direction telephony signals to the reverse direction circuitry of Base Transceiver Station (BTS) 116 via Broadband Distribution Network 114. In FIG. 6 the prior art reverse direction circuitry is at the top of the Figure. The RF carrier signal received from a prior art RASP 117 in the alpha channel, modulated by an encoded telephony signal, is input to filter 647 which removes spurious signals at the input of BTS 116. The received signal is then amplified by amplifier 648 and input to transceiver 649. Transceiver 649 is used to translate the received RF carrier signal to an IF carrier signal which is input to demodulator 650. Demodulator 650 extracts the encoded, analog telephony signal from the IF carrier signal in a manner well-known in the art. In the wireless telephony system described herein the carrier signal is phase shift key modulated. Upon demodulation in demodulator 650 the analog, encoded telephony signal is extracted. The demodulated analog, encoded, telephony signal is then input to analog to digital converter 651 which digitizes the encoded analog telephony signal. The now digitized and encoded telephony signal is then input to decoder 652 which decodes the signal to obtain the digitized telephony signal which is sent to Telephone System 115. The type of decoding that is done depends upon the system, and the types include, but are not limited to, the well-known CDMA and GSM systems.

The forward direction side of prior art BTS 116 is in the bottom row of FIG. 6. Digitized telephony signals received from Telephone System 115 are input to encoder 653. The type of encoding that is done depends upon the type of system and includes, but is not limited to, the well-known CDMA and GSM systems. The encoded digital telephony signal is then input to digital to analog converter 654 which converts the telephony signal into an analog signal. The now analog, encoded telephony signal is then input to modulator 655 which, in the prior art Base Transceiver Station (BTS) 116 shown in FIG. 6, phase shift key modulates an IF carrier signal in a matter well-known in the art. The IF carrier signal, modulated by the analog, encoded telephony signal, is then input to transceiver 666 which translates the IF carrier signal frequency to an RF carrier signal. The modulated RF carrier signal is then amplified by amplifier 667, spurious signals are filtered out by filter 668 and the RF carrier signal is sent to RASP 117 in FIG. 3. RASP 117 receives the RF carrier signal and processes it in the manner previously described with reference to FIG. 3.

In FIG. 7 is shown a block diagram of a new Base Transceiver Station (BTS) 116 which utilizes the teaching of the present invention. Each BTS 116 has three reverse direction circuits designated alpha, beta, and gamma; and three forward direction circuits designated alpha, beta, and gamma. In FIG. 7 only one reverse direction circuit and one forward direction circuit are shown. The three reverse direction circuits are identical and the three forward direction circuits are identical, so there is no need to show and describe the reverse direction and forward direction beta and gamma circuits to understand their operation. The reader is referred to the circuit description for FIG. 6.

When comparing the new reverse direction and forward direction BTS 116 circuitry shown in FIG. 7 with the prior art reverse direction and forward direction BTS 116 circuitry shown in FIG. 6, it can be seen that the two circuits are similar but the new reverse direction and forward direction circuitry shown in FIG. 7 is much simpler. Those portions of the alpha, beta, and gamma channel circuits in FIG. 7 that have corresponding circuits in FIG. 6 operate in the same manner and for the same purposes as the corresponding circuits in FIG. 6. Thus, for example, A/D converter 651 in FIG. 6 performs the same function and for the same purpose as A/D converter 751 in FIG. 7. Also, encoder 653 in FIG. 6 performs the same function and for the same purpose as encoder 753 in FIG. 7. Accordingly, the operation of the individual circuit elements in the reverse direction and forward direction circuits in FIGS. 7 are not described herein, and the reader is referred to the circuit description for FIG. 6 for an understanding of the operation of the circuit elements 750, 751, 752, 753, 754, and 755 in FIG. 7.

When comparing the prior art BTS in FIG. 6 and the new BTS in FIG. 7, it should noted that filters 647 and 668, amplifiers 648 and 667, and transceivers 649 and 666 are missing in FIG. 7. These circuit elements are not needed in the modified wireless telephone system per the teaching of the present invention. Filter 647, amplifier 648, and transceiver 649 in the reverse direction portion of BTS 116 serve the primary function of translating the RF carrier signal received from a prior art RASP 117 to an IF carrier signal. Transceiver 666, amplifier 667 and filter 668 in the forward direction portion of BTS 116 serve to translate the IF carrier signal used inside each BTS to an RF carrier signal for transmission to a RASP 117. As mentioned previously, in accordance with the teaching of the present invention the IF carrier signal is used to carry the telephony signals between RASPs 117 and BTSs 116, so circuits in prior art BTS 116 used to translate the IF carrier signal to an RF carrier signal for transmission to a RASP 117 are not needed. Three circuits are thereby eliminated.

Similarly, as described hereinabove with reference to FIG. 5, the new forward direction RASP 117 circuitry is designed to receive an IF carrier signal from BTS 116 per the teaching of the present invention. The primary purpose of transceiver 666, amplifier 667, and filter 668 in prior art BTS 116 is to translate the IF carrier signal used within BTS 116 to a RF carrier signal for transmission to a RASP 117. Thus, there is no need to translate the IF carrier signal within RASP 117 to an RF carrier signal, so circuits 666, 667 and 668 are eliminated.

It can be understood that each channel in Base Transceiver Station (BTS) 116 requires six less circuits when the teaching of present invention is implemented. With there being alpha, beta and gamma channels in the BTS 116 of FIG. 7, as described hereinabove, a total of eighteen circuits are eliminated in one BTS 116. In a typical wireless telephony system there are a number of Base Transceiver Stations (BTS) 116 so the cost savings is very significant. In addition to cost savings, a simpler BTS 116 will have fewer maintenance problems which results in additional savings. Further savings are achieved by lower power consumption of each BTS 116.

While the Base Transceiver Station (BTS) 116 described hereinabove is an analog version and utilizes analog to digital converter 651 and digital to analog converter 654, all digital BTSs exist. In an all digital BTS 116, converters 651 and 654 are deleted.

While what has been described hereinabove is the preferred embodiment of the present invention, it may be appreciated that one skilled in the art may make numerous changes without departing from the spirit and scope of the present invention. For example, demodulator 750 and modulator 755 of new BTS 116 in FIG. 7 may be located instead in RASP 117.

What is claimed is:

1. Centrally located equipment for use in a wireless telephone system that utilizes a broadband distribution network to carry telephony signals between a telephone network and wireless telecommunications devices using carrier signals, said centrally located equipment comprising:

a first circuit that interfaces with said telephone network, said first circuit receiving telephony signals from said telephone network and encoding said telephony signals into a first encoded telephony signal that is used to modulate a carrier signal having a first frequency to create a first IF carrier signal, and transmitting said first IF carrier signal; and a second circuit that interfaces with said first circuit and with said broadband cable network, said second circuit receiving said first IF carrier signal from said first circuit and processing same before translating the frequency of said first IF carrier signal to a second frequency to create a first RF carrier signal that is transmitted over said broadband distribution network to said wireless telecommunications devices; and wherein telephony signals from a wireless telecommunications device are encoded and used to modulate a carrier signal having a third frequency to create a second RF carrier signal that is transmitted over said broadband distribution network to said second circuit, wherein said second circuit processes said second RF carrier signal and then translates the frequency of said second RF carrier signal to a fourth frequency to create a second IF carrier signal that is transmitted to said first circuit, wherein said first circuit demodulates said second IF carrier signal to obtain said encoded telephony signal from said wireless telecommunications device, and wherein said first circuit decodes said last mentioned encoded telephony signal to obtain the telephony signals from said wireless telecommunications devices which are sent to said telephone network.

2. The invention in accordance with claim 1 wherein said first circuit comprises:

means for encoding telephony signals received from said telephone network to create said first encoded telephony signal; and means for modulating said carrier signal having said first frequency with said first encoded telephony signal to create said first IF carrier signal which is transmitted to said second circuit.

3. The invention in accordance with claim 2 wherein said first circuit further comprises:

means for demodulating said second IF carrier signal received from said second circuit to obtain said encoded telephony signal from said wireless telecommunications device; and means for decoding said last mentioned encoded telephony signal, which originated at a wireless telecommunications device, to obtain said telephony signal which is then sent to said telephone network.

4. The invention in accordance with claim 1 wherein said second circuit comprises:

means for performing signal processing on said second RF carrier signal received over said broadband distribution network from said wireless telecommunications device; and means for translating the frequency of said second RF carrier signal to a fourth frequency to create said second IF carrier signal which is then transmitted to said first circuit.

5. The invention in accordance with claim 4 wherein said second circuit comprises:

means for multiplexing said first IF carrier signal from said first circuit with other signals; and means for transmitting said multiplexed signals over said broadband distribution network to said wireless telecommunications device.

6. The invention in accordance with claim 3 wherein said second circuit comprises:

means for performing signal processing on said second RF carrier signal modulated with an encoded telephony signal and received over said broadband distribution network from said wireless telecommunications device; and means for translating the frequency of said second RF carrier signal to a fourth frequency to create said second IF carrier signal which is transmitted to said first circuit.

7. The invention in accordance with claim 6 wherein said second circuit further comprises:

means for multiplexing said first IF carrier signal from said first circuit with other signals; and means for transmitting said multiplexed signals over said broadband distribution network to said wireless telecommunications device.

8. The invention in accordance with claim 5 wherein said first circuit comprises:

means for encoding telephony signals received from said telephone network to create said first encoded telephony signal; and means for modulating said carrier signal having said first frequency with said first encoded telephony signal to create said first IF carrier signal which is transmitted to said second circuit.

9. The invention in accordance with claim 8 wherein said first circuit further comprises:

means for demodulating said second IF carrier signal received from said second circuit to obtain said encoded telephony signal; and means for decoding said last mentioned encoded telephony signal, which originated at a wireless telecommunications device, to obtain the telephony signal which is sent to said telephone network.

10. A method for transferring encoded telephony signals between a first and a second system member of centrally located equipment used in a wireless telephone system that utilizes a broadband distribution network to carry telephony signals between a telephone network and a wireless telecommunications device, said method comprising:

modulating a carrier signal having a first frequency with a telephony signal received from said telephone network in said first system member to create a first IF carrier signal, said modulation being done in said first system member;

transmitting said first IF carrier signal from said first system member to said second system member;

multiplexing with said second system member said first IF carrier signal with other signals originating at said telephone network;

translating with said second system member the frequency of said first IF carrier signal to a second frequency to create a first RF carrier signal; and transmitting from said second system member said first RF carrier signal over said broadband distribution network to said wireless telecommunications device.

11. The method in accordance with claim 10 further comprising:

performing signal processing in said second system member on a second RF carrier signal modulated with an encoded telephony signal which originates at a wireless telecommunications device and received over said broadband distribution network;

translating with said second system member the frequency of said second RF carrier signal to a fourth frequency to create a second IF carrier signal;

transmitting said second IF carrier signal from said second system member to said first system member; and demodulating with said first system member said second IF carrier signal to obtain said encoded telephony signal which is then forwarded to said telephone network.

12. A wireless telephone system, comprising:

a base transceiver station including:

an encoder for encoding a digitized telephony signal received from a telephone network into a first encoded telephony signal;

a D/A converter in communication with the first encoder for converting the first encoded telephony signal into a first analog encoded telephony signal; and a modulator in communication with the D/A converter for modulating a first IF carrier signal with the first analog encoded telephony signal; and a remote antenna signal processor in communication with the base transceiver station, the remote antenna signal processor including a first heterodyne stage for upconverting the first IF carrier signal received from the base transceiver station to a first RF carrier signal for transmission to a remote antenna driver in communication with the remote antenna signal processor via a broadband distribution network.

13. The wireless telephone system of claim 12, wherein:

the remote antenna signal processor further includes a second heterodyne stage for downconverting a second RF carrier signal received from the remote antenna driver via the broadband distribution network to a second IF carrier signal, wherein the second RF carrier signal and the second IF carrier signal are modulated by a second encoded telephony signal received by the remote antenna driver from a wireless telecommunications device; and the base transceiver station further includes:

a demodulator for demodulating the second IF carrier signal received from the remote antenna signal processor to obtain the second encoded telephony signal;

an A/D converter in communication with the demodulator for digitizing the second encoded telephony signal; and a decoder for decoding the second encoded telephony signal.

14. The wireless telephone system of claim 12, wherein the encoder encodes the digitized telephony signal received from the telephone network according to one of a CDMA technique and a GSM technique.

15. A wireless telephone system, comprising:

a remote antenna signal processor including a first heterodyne stage for downconverting an RF carrier signal received from a remote antenna driver via a broadband distribution network to an IF carrier signal, wherein the RF carrier signal and the IF carrier signal are modulated by an encoded telephony signal received by the remote antenna driver from a wireless telecommunications device; and a base transceiver station in communication with the remote antenna signal processor, the base transceiver station including:

a demodulator for demodulating the IF carrier signal received from the remote antenna signal processor to obtain the encoded telephony signal;

an A/D converter in communication with the demodulator for digitizing the encoded telephony signal; and a decoder in communication with the A/D converter for decoding the encoded telephony signal.

* * * * *